L. STEIGERT.

Machine for Chopping Meat.

No. 8,002. Reissued Dec. 18, 1877.

Inventor

Leopold Steigert

By F. Millward

Attorney

Attest

John E. Jones

Edgar J. Gross

N. PETERS, PHOTO-LITHOGRAPHER, WASHINGTON, D. C.

UNITED STATES PATENT OFFICE.

LEOPOLD STEIGERT, OF CINCINNATI, OHIO.

IMPROVEMENT IN MACHINES FOR CHOPPING MEAT.

Specification forming part of Letters Patent No. 98,812, dated January 11, 1870; Reissue No. 8,002, dated December 18, 1877; application filed February 2, 1877.

*To all whom it may concern:*

Be it known that I, LEOPOLD STEIGERT, of Cincinnati, in the county of Hamilton and State of Ohio, have invented a new and useful Improvement in Meat-Choppers; and I do hereby declare that the following is a full, clear, and exact description thereof, which will enable others skilled in the art to make and use the same, reference being had to the accompanying drawings, forming part of this specification.

This invention relates to that class of meat-choppers wherein a meat-chopping block revolving on a vertical axis and reciprocating cutters working in vertical planes upon the top of the said block are used; and it consists, first, in an improved arrangement of framing with relation to the chopping-block, by which the brackets which support the ways of the reciprocating cross-head of the cutters are made to project from the frame at points in advance of the back part of the chopping-block, so that there shall not be any projections from the back over the chopping-block, the object of this part of the invention being to adapt the machine to receive a solid detachable fender or guard at that side or part in which the cutters act—to wit, the rear—to prevent the knives from scattering the meat, which adheres to them more or less, about the floor or table wherever the machine rests; and it consists, in the second part, in the provision, in connection with the said peculiar framing and back fender or guard, of a top fender or fenders to prevent the upward scattering of meat.

Figure 1:
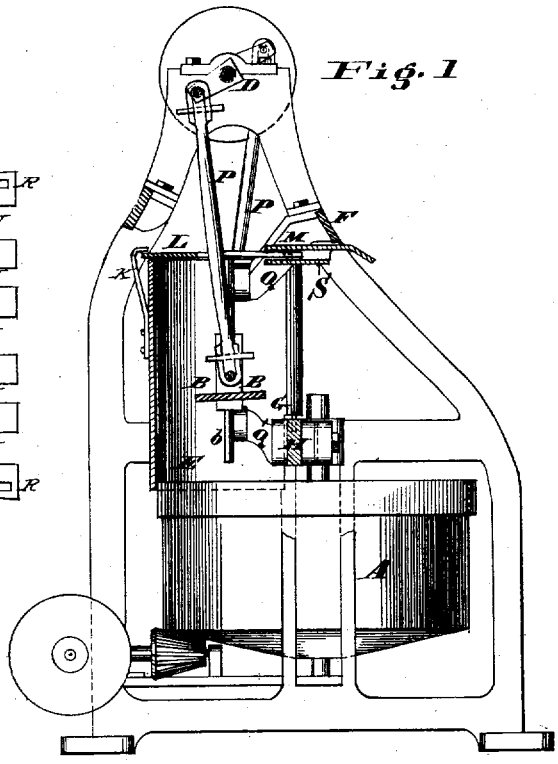
Figure 3:
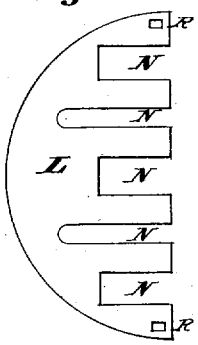
Figure 4:
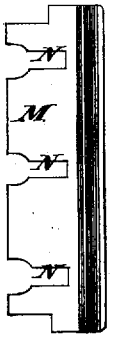
Figure 2:
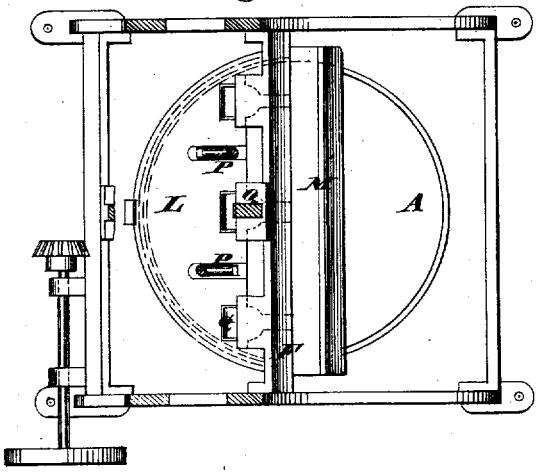
Figure 5:
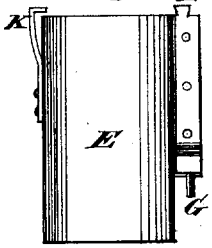

In the drawings, Figure 1 is a sectional elevation of a machine provided with guards according to my improvement. Fig. 2 is a longitudinal section of the same. Fig. 3 is a plan of one of the top guards. Fig. 4 is a plan of another top guard. Fig. 5 is a side elevation of the side guards.

Similar letters of reference indicate corresponding parts.

A is the revolving cutting-block, and B reciprocating cross-heads, to which the knives are attached. These cross-heads work vertically in ways or slides *b* above the upper end of the cutting-block, and are operated by a crank-shaft, D, at the top of the frame, through pitman P. They are worked very rapidly, and scatter the meat adhering to the cutters in all directions from the top of the cutter-block, but to much greater extent from the side on which the cutters act. I therefore construct the frame of the machine so as to permit of the convenient attachment and removal of a fender or fenders, on which the meat may be thrown and collected. As the main guard or fender will necessarily occupy a position on that side of the block on which the cutters act, I construct the framing so as to sustain the ways from points so far in front of the machine as to leave a clear, unobstructed space back of the ways for the convenient attachment and removal of said fender. If said ways were supported by brackets extending from the bottom of the ways directly to the rear of the machine, so as to connect with the frame back of the cutting-block, (the mode of construction practiced heretofore,) said brackets would be obstructions to the attachment and removal of the fender. I therefore construct the framing with cross-bars F H, which connect the housings or sides of the frame together, and from these cross-bars, which are in advance of the space for the rear guard or fender, I project brackets or braces Q Q′, which support the tops and bottoms of the ways *b*, respectively.

E is the rear guard or fender, made of sheet metal, and arranged to fit the upper outer edge of the block for about half its circumference, and to extend above the highest point the cross-heads reach in operation, and nearly to the lower edge of the cross-bar F. The said guard is provided with pins G, fitted to engage in holes in the top of the cross-bar H to hold it in place. It is also provided with lugs I above the pins, and a spring-catch, K, at the rear, for holding the top covers or guards. L is a rear top guard or fender, and M a front one. Both are provided with suitable slots N, to pass the connecting rods or pitmen P and the brackets or braces Q for supporting the cross-heads, and the one, L, is provided with holes R at the corners, to receive the lugs I on the guard E, which, together with the spring K, prevent it from sliding off. The guard M slides under the cross-bar F, and laps above the front edge of the other guard, as shown in cross-section in Fig. 1, and has plates S attached to the under side, a short distance from the surface, to provide space for the reception of the tongues of the part L formed by the notched slots N. The front edge of the guard M projects downward a short distance, and arrests the particles thrown up over the bar H, which prevents any considerable amount being thrown out at the front.

Having thus described my invention, I claim as new and desire to secure by Letters Patent—

1. The combination, substantially as specified, of the rotating block, the solid stationary guard or fender behind it, the reciprocating cutters, and the cutter-guides, the lower ends of which are rigidly connected with the frame in front of the said guard or fender.

2. The combination, substantially as specified, of the rotating block, the solid stationary guard or fender behind it, the reciprocating cutters, and the cutter-guides, both the lower and the upper ends of which are rigidly connected with the frame in front of the said guard or fender.

3. The combination, substantially as specified, of the solid stationary guard or fender E, the guards or fenders L M, and the chopping-block A, in relation to which, and to cutters and framing, the said several guards or fenders are arranged substantially as herein shown and described, and for the purpose set forth.

In testimony of which invention I hereunto set my hand.

LEOPOLD STEIGERT.

Witnesses:
JOHN E. JONES,
GEORGE FEZER.